United States Patent [19]
Simmons

[11] Patent Number: 5,909,641
[45] Date of Patent: Jun. 1, 1999

[54] TRANSMIT/RECEIVE SWITCH

[75] Inventor: William Davis Simmons, Bellvue, Wash.

[73] Assignee: AT&T Wireless Services Inc., Kirkland, Wash.

[21] Appl. No.: 08/803,832

[22] Filed: Feb. 24, 1997

[51] Int. Cl.[6] .............................. H04Q 7/00; H01P 1/10
[52] U.S. Cl. ............................ 455/78; 455/83; 455/562; 333/103; 333/104
[58] Field of Search .................................... 455/561, 562, 455/67.1, 67.4, 73, 78, 82, 83, 84, 80, 81; 333/103, 104, 262

[56] References Cited

U.S. PATENT DOCUMENTS

| | | | |
|---|---|---|---|
| 4,415,770 | 11/1983 | Kai et al. ................................ | 455/67.3 |
| 4,726,051 | 2/1988 | Schuermann . | |
| 4,885,799 | 12/1989 | Van Horn ................................ | 455/83 |
| 5,084,869 | 1/1992 | Russell . | |
| 5,109,205 | 4/1992 | Hart et al. . | |
| 5,272,762 | 12/1993 | Hanson et al. ............................ | 455/80 |
| 5,274,343 | 12/1993 | Russell et al. ............................ | 33/262 |
| 5,319,802 | 6/1994 | Camiade et al. .......................... | 455/78 |
| 5,485,130 | 1/1996 | Nakahara et al. ....................... | 333/262 |
| 5,519,364 | 5/1996 | Kato et al. ................................ | 33/104 |
| 5,678,199 | 10/1997 | Birth et al. ............................... | 455/80 |
| 5,699,023 | 12/1997 | Tanaka et al. ........................... | 333/103 |
| 5,742,589 | 4/1998 | Murata ..................................... | 455/67.4 |
| 5,768,691 | 8/1996 | Matero et al. ............................ | 455/78 |

FOREIGN PATENT DOCUMENTS

| | | |
|---|---|---|
| 0 446 050 | 9/1991 | European Pat. Off. . |
| 0 723 338 | 7/1996 | European Pat. Off. . |

*Primary Examiner*—Curtis A. Kuntz
*Assistant Examiner*—Jean A. Gelin

[57] ABSTRACT

A transmit/receive switch includes a first quarter-wavelength transmission line coupled between an antenna port and a first variable impedance device. The first variable impedance device is coupled between the first quarter-wavelength transmission line and a signal common node. An impedance of the first variable impedance device is controllable variable between a low impedance value and a high impedance value. A second quarter-wavelength transmission line is coupled between first variable impedance device and a first port. A third quarter-wavelength transmission line is coupled between the antenna port and a second variable impedance device. The second variable impedance device is coupled between the third quarter-wavelength transmission line and the signal common node. Like the first variable impedance device, an impedance of the second variable impedance device is controllable variable between a low impedance value and a high impedance value. A fourth quarter-wavelength transmission line is coupled between the second variable impedance device and a second port.

9 Claims, 4 Drawing Sheets ic bandwidth in the frequency range of 1850 to 1990 MHz. The frequency spacing between each tone is 3.125 KHz. The total set of tones are numbered consecutively from 0 to 2559, starting from the lowest frequency tone. The tones are used for carrying traffic messages and overhead messages between a base station and a plurality of remote units (RUs). The traffic tones are divided into 32 traffic partitions, with each traffic channel requiring at least one traffic partition of 72 tones.

TRANSMIT/RECEIVE SWITCH

CROSS-REFERENCES TO RELATED APPLICATIONS

The invention disclosed herein is related to the copending US patent application by Siavash Alamouti, Doug Stolarz, and Joel Becker, entitled "VERTICAL ADAPTIVE ANTENNA ARRAY FOR A DISCRETE MULTITONE SPREAD SPECTRUM COMMUNICATIONS SYSTEM", Ser. No. 08/806,516, filed on the same day as the instant patent application, assigned to AT&T Wireless Services, and incorporated herein by reference.

BACKGROUND OF THE INVENTION

1. Field of the Invention

The present invention relates to communications systems. More particularly, the present invention relates to wireless discrete multitone spread spectrum communications systems.

2. Description of Related Art

Wireless communications systems, such as cellular and personal communications systems, operate over limited spectral bandwidths and must make highly efficient use of the scarce bandwidth resource for providing quality service to a large population of users. Code Division Multiple Access (CDMA) protocol has been used for wireless communications systems for making efficiently use of limited bandwidths and uses a unique code for distinguishing each user's data signal from other users' data signals. Knowledge of the unique code with which any specific information is transmitted permits separation and reconstruction of each user's message at a receiving end of a communication channel.

The personal wireless access network (PWAN) system described in the referenced Alamouti, Stolarz, et al. patent application uses a form of the CDMA protocol known as discrete multitone spread spectrum (DMT-SS) for providing efficient communications between a base station and a plurality of remote units. In the DMT-SS protocol, a user's data signal is modulated by a set of weighted discrete frequencies or tones that are spreading codes that distribute the data signal over many discrete tones covering a broad range of frequencies. The weights are complex numbers having a real component that is used for modulating the amplitude of a tone and a complex component that is used for modulating the phase of the same tone. Each tone in the weighted-tone set bears the same data signal. Plural users at the transmitting station can use the same tone set for transmitting their data, but each user sharing the tone set has a different set of spreading codes. The weighted-tone set for a particular user is transmitted to the receiving station where it is processed with despreading codes related to the user's spreading codes, for recovering the user's data signal. For each of a plurality of spatially separated antennas at the receiver, the received multitone signals are transformed from time-domain signals to frequency-domain signals. Despreading weights are assigned to each frequency component of the signals received by each antenna element. The values of the despreading weights are combined with the received signals for obtaining an optimized approximation of individual transmitted signals characterized by a particular multitone set and transmitting location.

The PWAN system disclosed in the referenced Alamouti, Stolarz, et al. application has a total of 2560 discrete tones (carriers) that are equally spaced in 8 MHz of available In addition, the PWAN system uses overhead tones for establishing synchronization and for passing control information between a base station and remote units. A Common Link Channel (CLC) is used by a base station for transmitting control information to a remote unit. A Common Access Channel (CAC) is used for transmitting messages from a remote unit to a base station. There is one grouping of tones assigned to each channel. The overhead channels are used in common by all remote units when control messages are exchanged with a base station.

In the PWAN system, Time Division Duplexing (TDD) is used by a base station and a remote unit for transmitting data and control information in both directions over the same multi-tone frequency channel. Transmission from a base station to a remote unit is called "forward transmission" and transmission from a remote unit to a base station is called "reverse transmission". The time between recurrent transmissions from either a remote unit or a base station is called the TDD period. In every TDD period, there are four consecutive transmission bursts in each direction. Data is transmitted during each burst using multiple tones. A base station and each remote unit must synchronize and conform to the TDD timing structure and both a base station and a remote unit must synchronize to a framing structure. All remote units and base stations are globally synchronized so that all remote units transmit at the same time and then all base stations transmit at the same time. When a remote unit initially powers up, it acquires synchronization from a base station so that it can exchange control and traffic messages within the prescribed TDD time format. A remote unit must also acquire frequency and phase synchronization for the DMT-SS signals so that the remote unit is operating at the same frequency and phase as the base station.

The PWAN system uses a retro directivity principle that relies on the transmit and receive paths at the base station being identical. Since the base station electronics are not identical because of the effects of component tolerances, component drift over temperature and time, and other commonly encountered phenomena, measurements of the transfer functions of the circuitry used for both paths are made. A set of compensating weights are generated and applied to transmitted data so that the forward and reverse paths appear identical at an antenna. The compensation weights provide an additive or more applicable factor making the effect of the despreading weights and the spreading weights the same.

Further, since the PWAN system uses a TDD format, the compensation measurements of the transmit and receive path circuitry are made during the respective idle times of the paths. The time domain duplexing of an airlink results in a 50% duty cycle for utilization of the transmit and receive circuits. Therefore, compensation measurements for the circuitry of a particular path are performed when an airlink does not require its use. Use of the transmit/receive duty cycle of the forward and reverse circuits for making transmit/receive compensation measurements frees system bandwidth and provides much greater measurement flexibility.

FIG. 3 shows a prior-art series-shunt switch 30 that has been used as a transmit/receive switch. An antenna node 31 is connected through a diode 32 to a transmit port TX, and through a quarter-wavelength transmission line 33 to receive port RX. A diode 34 is connected between receive port RX and a signal common. When a bias voltage is applied at $V_b$, then both diodes 32 and 34 are biased to a low impedance state. The low impedance of diode 34 is transformed into a high impedance at antenna node 31 through quarter-wavelength transmission line 33, thus isolating the RX port from the transmission power applied at the TX port. Switch 30 is unsuitable for allowing testing during idle times of transmit and receive paths because it does not adequately isolate one path from the other during idle times.

FIG. 4 shows a prior art all-shunt diode SP2T switch 40 that has also been used as a transmit/receive switch. An antenna node 41 is connected transmit port TX through a quarter-wavelength transmission line 42, and to a receive port RX through a quarter-wavelength transmission line 43. A diode 44 is connected from the TX port to a signal common and, similarly, a diode 45 is connected from the RX port to the signal common. Capacitors C provide DC isolation between the TX port and the RX port. The antenna node 41 is connected to the TX port when diode 45 is biased into a low-impedance state. The low impedance of diode 45 is transformed into a high impedance at antenna node 41 through quarter-wavelength transmission line 43. When diode 44 is biased into a low-impedance state, antenna node 41 is connected to the RX port. Switch 40 is unsuitable for allowing transmit and receive path testing during path idle times because switch 40 does not adequately isolate one path from the other during path idle times.

What is needed is a transmit/receive switch that allows transmit and receive paths of the PWAN system to be tested during idle times.

SUMMARY OF THE INVENTION

The present invention advantageous provides a transmit/receive switch that allows transmit and receive paths to be tested during respective idle times. In that regard, the present invention provides transmit/receive switch that includes a first quarter-wavelength transmission line coupled between an antenna port and a first variable impedance device. The first variable impedance device is coupled between the first quarter-wavelength transmission line and a signal common node. An impedance of the first variable impedance device is controllable variable between a low impedance value and a high impedance value. A second quarter-wavelength transmission line is coupled between first variable impedance device and a first port. A third quarter-wavelength transmission line is coupled between the antenna port and a second variable impedance device. The second variable impedance device is coupled between the third quarter-wavelength transmission line and the signal common node. Like the first variable impedance device, an impedance of the second variable impedance device is controllable variable between a low impedance value and a high impedance value. A fourth quarter-wavelength transmission line is coupled between the second variable impedance device and a second port.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
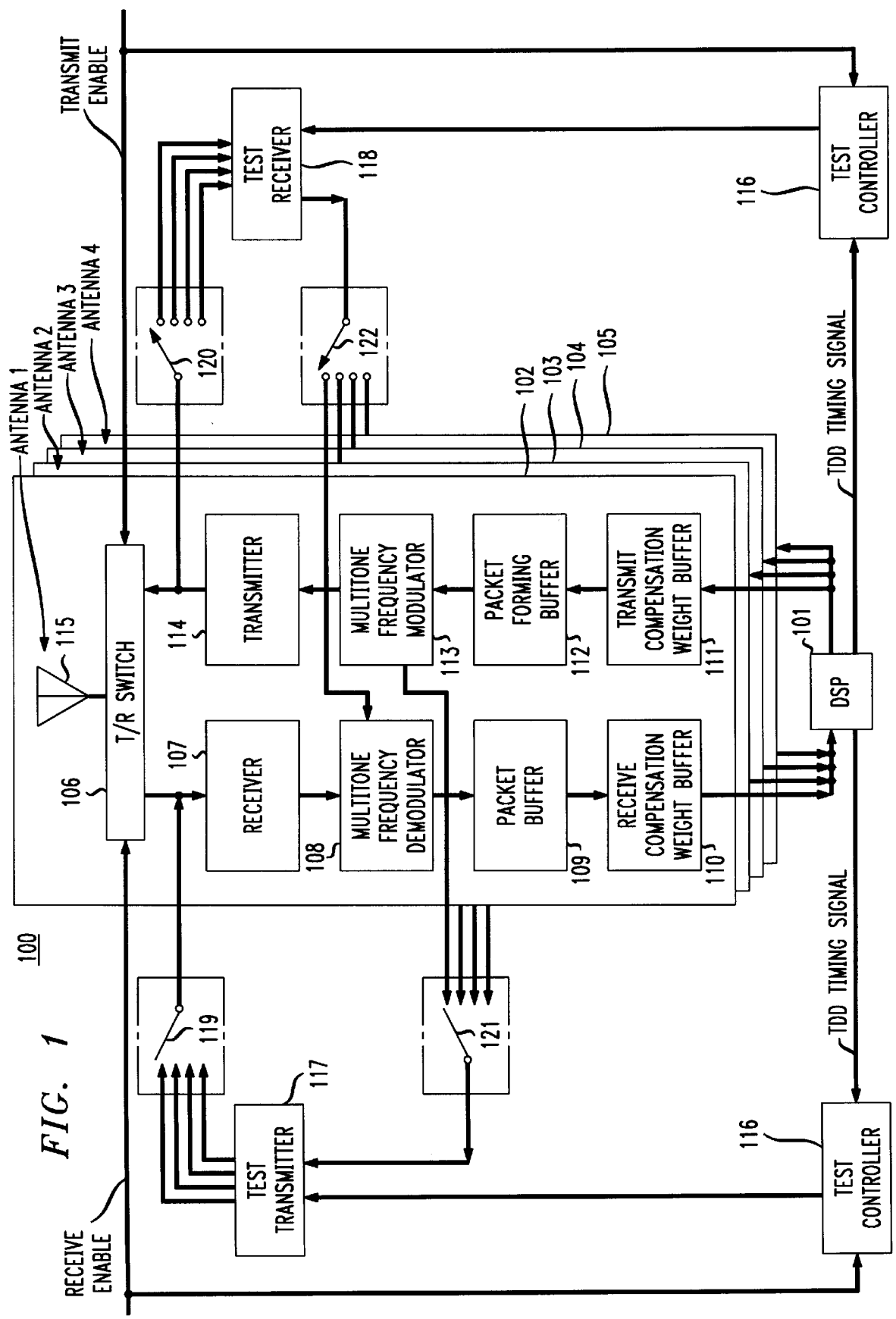
FIG. 1 is a block diagram showing an overview of transmit/receive compensation of a PWAN system.

FIG. 1 is a block diagram showing an overview of a system providing transmit and receive compensation for a base station 100 of a personal wireless access network (PWAN). Base station 100 has multiple antennas 115 for spatial, as well as spectral, spreading and despreading of discrete multitone spread spectrum (DMT-SS) communications. Each antenna 115 has an associated transmit/receive module having transmission path components and receive path components. Base station 100 also includes a digital signal processor (DSP) 101 connected to each of the four transmit/receive modules 102, 103, 104 and 105. DSP 101 applies spreading and despreading weights for DMT-SS signals for the transmit path and the receive path, respectively, for each antenna 115. Each module 102, 103, 104 and 105 is configured to have the same transmit and receive components, of which only the components for module 102 and the connection to DSP 101 are shown and described. Module 102 includes a transmit path and a receive path that are connected in parallel between I)SP 101 and a transmit/receive (T/R) switch 106. T/R switch 106 is connected to an antenna 115. The transmit path includes a transmit compensation weight buffer 111, a packet forming buffer 112, a multitone frequency modulator 113, and a transmitter 114. When module 102 is in a transmit mode, signal flow through the transmit path is from DSP 101 to transmit compensation weight buffer 111, to packet forming buffer 112, to multitone frequency modulator 113, to transmitter 114, and lastly through T/R switch 106 to antenna 115. The receive path includes a receiver 107, a multitone frequency demodulator 108, a packet buffer 109 and a receiver compensation weight buffer 110. When module 102 is in a receive mode, signal flow is from antenna 115 through T/R switch 106 to receiver 107, to multitone frequency demodulator 108, to packet buffer 109, to receive compensation weight buffer 110 and to DSP 101.

The characteristics of the components forming the transmit and receive paths of the respective modules have different values based on component tolerances and that tend to drift over time and in changes in ambient temperature. To compensate for the component tolerances and for drift, the transmission and receive paths for each respective antenna is sequentially tested for measuring the drift of the transmit path components and the receive path components. Compensating weights for each path are generated that are then applied to signals processed in each path. To accomplish this, base station 100 includes a test controller 116 that is connected to DSP 101. Test controller 116 is connected to a test transmitter 117 and a test receiver 118. Test controller 116 is shown in FIG. 1 as two blocks for illustrative convenience. Test transmitter 117 is connected to each module 102, 103, 104 and 105 through a switch 119 so that a receive test signal can be sequentially applied to receiver 107 on each module. Test transmitter 117 receives an output signal from multitone frequency modulator 113 through a switch 121. Test receiver 118 is connected to each module 102, 103, 104 and 105 through a switch 120 so that a transmit signal can be sequentially applied from transmitter 114 to receiver 118 on each transmit/receive module. Test receiver 118 applies an output signal to multitone frequency demodulator 108 through a switch 122.

Figure 2:
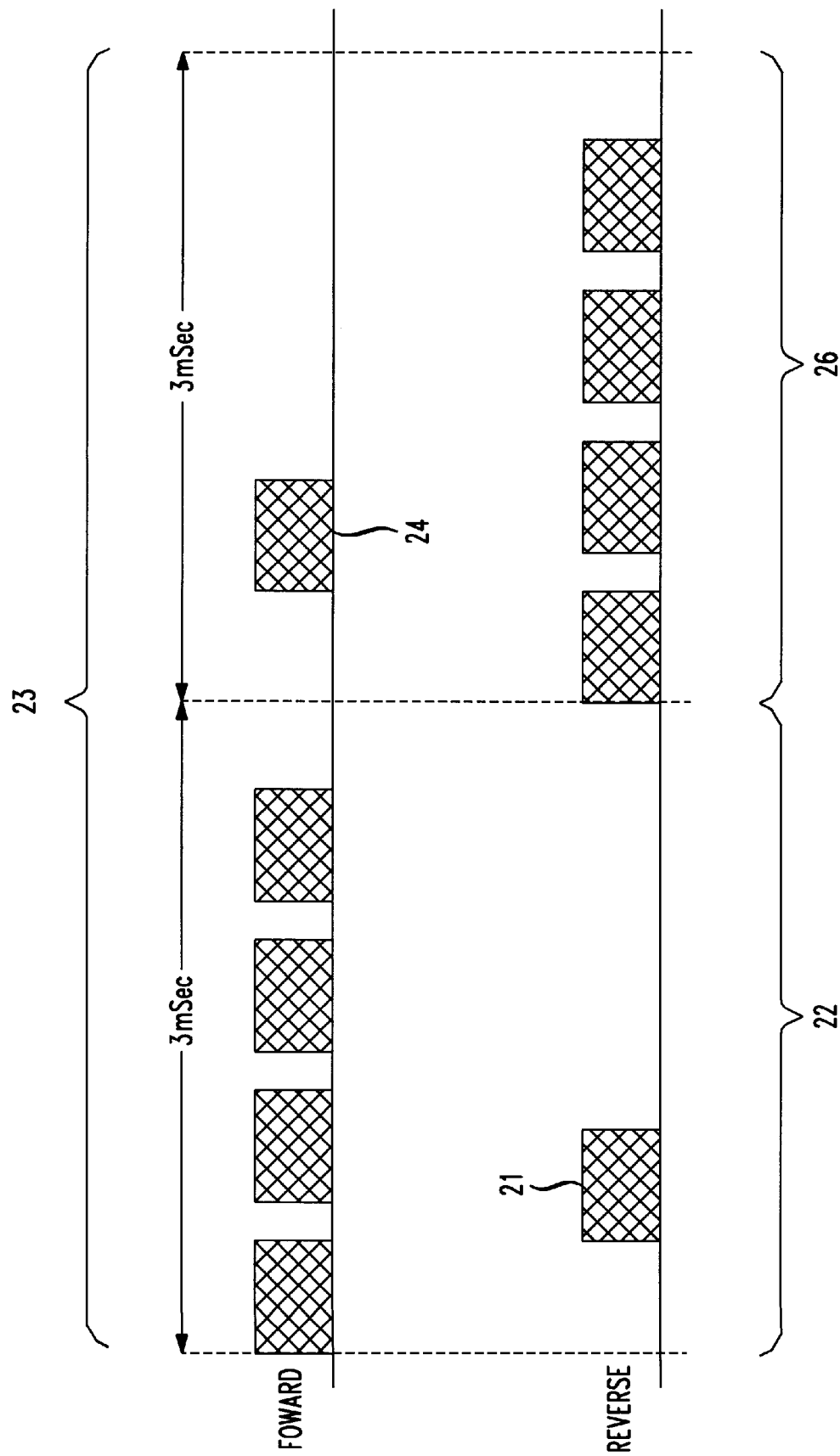
FIG. 2 is a timing diagram for transmit/receive compensation timing for a base station of a PWAN system.
Figure 3:
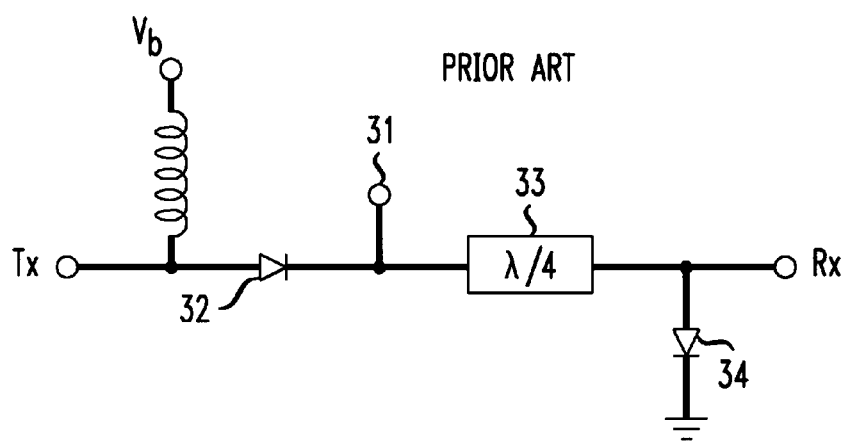
FIG. 3 shows a schematic diagram of a prior-art transmit/receive switch.
Figure 4:
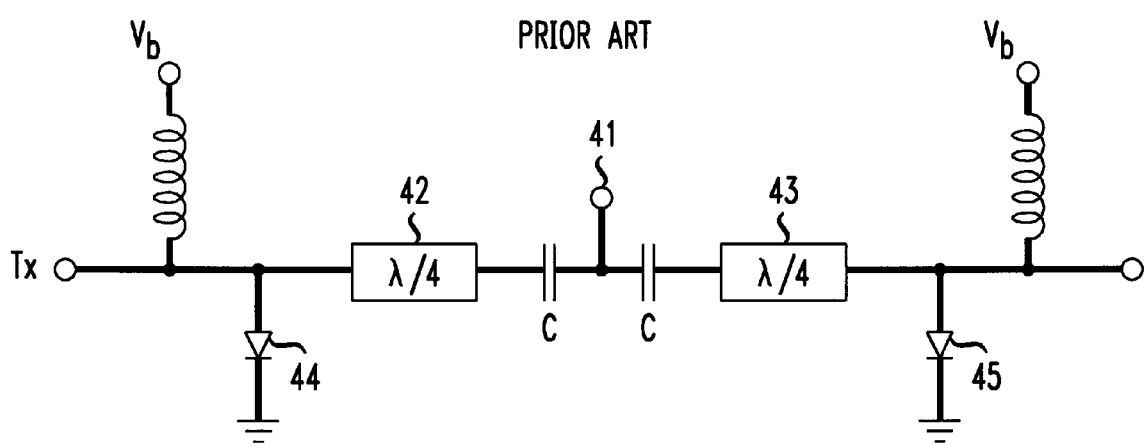
FIG. 4 shows a schematic diagram of another prior-art transmit/receive switch.

FIG. 2 is a timing diagram for transmit/receive compensation timing for the base station. In a time division duplex (TDD) system, compensation measurements 21 are sequentially made for the receive circuitry of each module during the transmit portion 22 of the TDD cycle 23 and compensation measurements 24 are made for the transmission circuitry during the receive portion 26 of the TDD cycle 23. This approach does not use system bandwidth because when the transmitter portion of a module is active, the receiver portion is being tested and compensated for. Conversely, when the receiver portion of a module is active, the transmitter portion is being tested and compensated for.

In a first TDD interval, test controller 16 uses a TDD timing signal from DSP 101 for first testing the receive path of a first antenna during the base station transmission period. Referring to transmit/receiver module 102, test controller 116 directs a multitone test signal output from frequency modulator 113 in the transmit path and applies it to test transmitter 117. Switch 119 is controlled so that a multitone signal output from test transmitter 117 is applied to the input of receive amplifier 107 in the receive path of module 102. DSP 101 processes the received test signal output by receive amplifier 107 and compiles receive path compensation weights that are stored in receive path compensation buffer 110. The stored receive path compensation weights are then applied to the DMT-SS signals received in all subsequent TDD receive periods until the receive path test for module 102 are repeated.

In the base receive period of the first TDD interval, test controller 116 uses the TDD timing signal from DSP 101 for testing the transmission path of module 102. To test the transmission path, a multitone test signal output from frequency modulator 113 is used for testing the transmit path of module 102. Test controller 116 controls switch 120 so that the resultant signal output from transmitter 114 is directed to the input of test receiver 118. The output of test receiver 118 is then applied to multitone frequency demodulator 108 in the receive path, for a short interval so not to overlap actual DMT-SS signals that are output by receive amplifier 107 during the receive period. DSP 101 processes the received test signal from test receiver 118 and compiles transmit path compensation weights that are stored in transmit path compensation buffer 111. The stored transmit path compensation weights are then applied to DMT-SS signals transmitted in all subsequent TDD receive periods until the transmit path test for module 102 is repeated.

Test controller 116 then moves on to transmit/receive module 103 in the next consecutive (second) TDD interval. Test controller 116 uses the TDD timing signal from DSP 101 for first testing the receive path of module 103 during base station transmission period, and then for testing the transmit path of module 103 during base station receive period. Once module 103 has been tested, test controller 116 moves on to transmit/receive module 104. When module 104 has been tested, test controller tests module 105. When module 105 has been tested, module 102 is retested, and so on.

Figure 5:
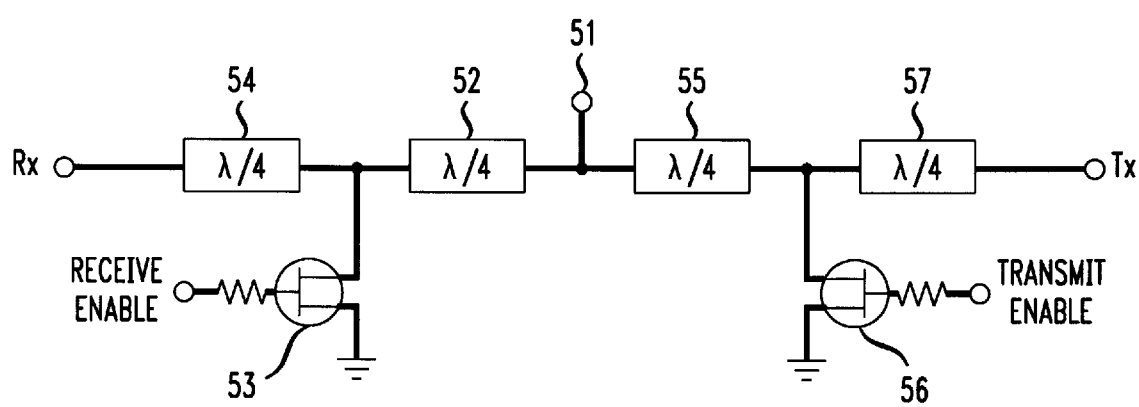
FIG. 5 shows a schematic diagram of a symmetric quarter-wavelength transmit/receive switch according to the present invention.

FIG. 5 shows a schematic diagram of a transmit/receive switch 50 that allows the transmit and receive paths of a transmit/receive module to be tested during path idle times. Transmit/receive switch 50 includes an antenna port 51, a receive port RX and a transmit port TX. One end of a first quarter-wavelength transmission line 52 is coupled to antenna port 51. The other end of transmission line 52 is coupled to a drain terminal of FET transistor 53. A second quarter-wavelength transmission line 54 coupled between the drain of FET transistor 53 and the RX port. A third quarter-wavelength transmission line 55 has one end coupled to antenna port 51 and to a drain terminal of FET transistor 56. A fourth quarter-wavelength transmission line 57 coupled between the drain of FET transistor 56 and the TX port. The source terminals of FET transistors 53 and 56 are coupled to a signal common or ground.

Transmission lines 52, 54, 55 and 57 are preferably formed from strip lines or microstrip lines. The actual length of each of quarter-wavelength transmission lines 52, 54, 55 and 57 is based on the particular frequency used for the PWAN system, that is, 1.9 GHz. Preferably, transistors 53 and 56 are each gallium arsenide FET transistors that are complementarily controlled so that when one is in a high impedance state, the other is a low impedance state. That is, when the receive enable signal (FIG. 1) applied to the gate terminal of transistor 53 is low, the transmit enable signal applied to the gate terminal of transistor 56 is high. Conversely, when the receive enable signal Is high, the transmit enable signal is low.

The RX port of transmit/receive switch 50 is connected to both the input of receiver 107 and the common connection of switch 119, as shown in FIG. 1. The TX port of switch 50 is connected to both the output of transmitter 114 and the common connection of switch 120. When transistor 53 is controlled to be in a low impedance state, that is, conducting, transistor 56 is controlled to be in a high impedance state, that is, non-conducting. Transmit signals output from transmitter 114 are operatively connected from the TX port to antenna port 51. The low impedance of transistor 53 is transformed into a high impedance at antenna port 51 through quarter-wavelength transmission line 52, isolating the RX port from the transmit signal appearing at antenna port 51. Simultaneously, switch 119 is controlled to connect test transmitter 117 to the input of receiver 107. The low impedance of transistor 53 is also transformed into a high impedance at the RX node through quarter-wavelength transmission line 54, isolating the test signal output from test transmitter 117 from the portion of switch 50 appearing to the right of transistor 53 in FIG. 5. The test signal output from test transmitter 107 is directed through switch 119 to receiver 107.

When transistor 56 is controlled to be in a low impedance state, transistor 53 is controlled to be in a high impedance state. Signals received from antenna 115 are operatively connected from antenna port 51 to the RX port. The low impedance of transistor 56 is transformed into a high impedance at antenna port 51 through quarter-wavelength transmission line 55, isolating the TX port from antenna port 51. Simultaneously, switch 120 is controlled to connect transmitter 114 to the input of test receiver 118. The low impedance of transistor 56 is also transformed into a high impedance at the TX node through quarter-wavelength transmission line 57, isolating the test transmit signal output from transmitter 114 from the portion of switch 50 appearing to the left of transistor 56 in FIG. 5. The transmit test signal is directed through switch 122 and to multitone frequency demodulator 108 for a short interval so not to overlap actual DMT-SS signals that are received by receiver 107 during the receive period.

Figure 6:
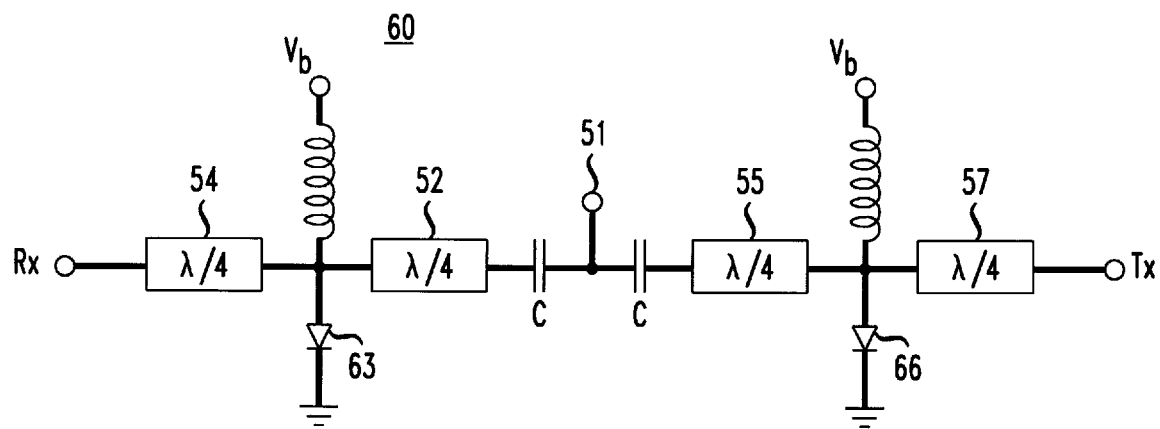
FIG. 6 shows a schematic diagram of an alternative configuration of a symmetric quarter-wavelength transmit/receive switch according to the present invention.

FIG. 6 shows a schematic diagram of an alternate configuration of a transmit/receive switch 60 that allows the transmit and receive paths to be tested during idle times. Transmit/receive switch 60 is similar to switch 50 except that transistors 53 and 56 have been replaced by PIN diodes 63 and 66, respectively, and appropriate biasing terminals $V_b$ have been added for biasing diodes 63 and 66. Capacitors C are used for DC isolation.

While the present invention has been described in connection with the illustrated embodiments, it will be appreciated and understood that modifications may be made without departing from the true spirit and scope of the invention.

What is claimed is:

1. A transmit/receive switch comprising:

an antenna port;

a signal common node;

a first port;

a second port;

a first quarter-wavelength transmission line having a first end and a second end, the first end of the first quarter-wavelength transmission line being coupled to the antenna port;

a first variable impedance device coupled between the second end of the first quarter-wavelength transmission line and the signal common node, an impedance of the first variable impedance device being controllable variable between a low impedance value and a high impedance value;

a second quarter-wavelength transmission line coupled between the second end of the first quarter-wavelength transmission line and the first port;

a third quarter-wavelength transmission line having a first end and a second end, the first end of the third quarter-wavelength transmission line being coupled to the antenna port;

a second variable impedance device coupled between the second end of the third quarter-wavelength transmission line and the signal common node, an impedance of the second variable impedance device being controllable variable between a low impedance value and a high impedance value; and a fourth quarter-wavelength transmission line coupled between the second end of the third quarter-wavelength transmission line and the second port;

wherein the first and second variable impedance devices are oppositely controlled so that when the impedance of the first variable impedance device is controlled to be the low impedance value, the impedance of the second variable impedance device is controlled to be the high impedance value, and when the impedance of the first variable impedance device is controlled to the high impedance value, the impedance of the second variable impedance device is controlled to be the low impedance value.

2. The transmit/receive switch according to claim 1, wherein the first, second, third and fourth quarter-wavelength transmission lines are each microstrip transmission lines.

3. The transmit/receive switch according to claim 2, wherein the transmit/receive switch is used in a personal communication device that is part of a personal communication system, and wherein a length of each of the first, second, third and fourth quarter-wavelength transmission lines is selected based on a wavelength used by the personal communication system.

4. The transmit/receive switch according to claim 2, wherein the first and second variable impedance devices are each FET transistors.

5. The transmit/receive switch according to claim 4, wherein the first and second variable impedance devices are each gallium arsenide FET transistors.

6. The transmit/receive switch according to claim 2, wherein the first and second variable impedance devices are each PIN diodes.

7. A transmit/receive switch comprising:

an antenna port;

a signal common node;

a first port;

a second port;

a first quarter-wavelength transmission line having a first end and a second end, the first end of the first quarter-wavelength transmission line being coupled to the antenna port;

a first variable impedance device coupled between the second end of the first quarter-wavelength transmission line and the signal common node, an impedance of the first variable impedance device being controllable variable between a low impedance value and a high impedance value:

a second quarter-wavelength transmission line coupled between the second end of the first quarter-wavelength transmission line and the first port;

a third quarter-wavelength transmission line having a first end and a second end, the first end of the third quarter-wavelength transmission line being coupled to the antenna port;

a second variable impedance device coupled between the second end of the third quarter-wavelength transmission line and the signal common node, an impedance of the second variable impedance device being controllable variable between a low impedance value and a high impedance value;

a fourth quarter-wavelength transmission line coupled between the second end of the third quarter-wavelength transmission line and the second port;

a transmitter coupled to the first port;

a receiver coupled to the second port, and wherein the first and second variable impedance devices are oppositely controlled so that when the impedance of the first variable impedance device is controlled to be the low impedance value, the impedance of the second variable impedance device is controlled to be the high impedance value, and when the impedance of the first variable impedance device is controlled to the high impedance value, the impedance of the second variable impedance device is controlled to be the low impedance value.

8. The transmit/receive switch according to claim 7, further comprising:

a first switch coupled to the first port;

a second switch coupled to the second port;

a test receiver coupled to the first port through the first switch; and a test transmitter coupled to the second port through the second switch.

9. The transmit/receive switch according to claim 8, wherein when the impedance of the first variable impedance device is the high impedance value, the second switch is controlled so that the test transmitter is coupled to the receiver, and wherein when the impedance of the first variable impedance device is the low impedance value, the first switch is controlled so that the test receiver is coupled to the transmitter.

* * * * *